United States Patent
John et al.

(10) Patent No.: US 9,705,926 B2
(45) Date of Patent: Jul. 11, 2017

(54) SECURITY AND RETENTION TAGGING

(71) Applicant: Avaya Inc., Santa Clara, CA (US)

(72) Inventors: Ajita John, Holmdel, NJ (US); Seamus Hayes, Clarinbridge (IE); John Rix, Rahoon (IE); Adrian Ryan, Craughwell (IE); Samuel Fisher, Greenville, SC (US); David Skiba, Golden, CO (US)

(73) Assignee: Avaya Inc., Santa Clara, CA (US)

( * ) Notice: Subject to any disclaimer, the term of this patent is extended or adjusted under 35 U.S.C. 154(b) by 117 days.

(21) Appl. No.: 14/823,173

(22) Filed: Aug. 11, 2015

(65) Prior Publication Data
US 2017/0048275 A1    Feb. 16, 2017

(51) Int. Cl.
*H04L 29/06* (2006.01)
*G06F 21/62* (2013.01)

(52) U.S. Cl.
CPC .......... *H04L 63/20* (2013.01); *G06F 21/6245* (2013.01); *H04L 63/08* (2013.01); *H04L 63/10* (2013.01)

(58) Field of Classification Search
CPC ..................................................... H04L 63/20
USPC ............................................................ 726/1
See application file for complete search history.

(56) References Cited

U.S. PATENT DOCUMENTS

| | | | |
|---|---|---|---|
| 4,945,563 A * | 7/1990 | Horton | H04N 5/913 360/60 |
| 6,278,836 B1 * | 8/2001 | Kawara | G11B 19/12 360/60 |
| 8,379,819 B2 | 2/2013 | Diskin et al. | |
| 8,391,455 B2 | 3/2013 | Kelkar et al. | |
| 8,849,879 B2 | 9/2014 | John et al. | |
| 2012/0030368 A1 | 2/2012 | John et al. | |
| 2012/0072845 A1 | 3/2012 | John et al. | |
| 2012/0110196 A1 | 5/2012 | Balasaygun et al. | |
| 2013/0290494 A1 * | 10/2013 | Goudarzi | H04L 65/1046 709/219 |
| 2014/0081643 A1 | 3/2014 | John et al. | |

* cited by examiner

*Primary Examiner* — Jacob Lipman
(74) *Attorney, Agent, or Firm* — Sheridan Ross P.C.

(57) ABSTRACT

Media files are often tagged, such as by XML or other tagging paradigms, in order to indicate aspects of certain portions of the media file. Disclosed herein, security policy tagging is provided that supports a logically nested or hierarchical structure. Tags may be time- and/or event-altered, such as when a user who is denied access at one point in time may be granted access at a later point in time. The need to amend the security policy based upon the passage of time is reduced or eliminated as portions, or sub-portions, of a media file that may be selectively tagged with security tags may be presented or downloaded based upon the security policy. The a security policy may incorporate rules that change permissions upon the passage of time or the occurrence of an event, without requiring the modification of the presentation, the security tags of the presentation portion, or the security tag associated with a parent portion of the presentation or the presentation itself.

20 Claims, 7 Drawing Sheets

SECURITY AND RETENTION TAGGING

FIELD OF THE DISCLOSURE

The present disclosure is generally directed towards selectively providing and denying access to portions of electronic media content

BACKGROUND

Tagging electronic media files has become popular and useful. Often a tag may be provided to identify a content portion within the media file, such as when the discussion of a particular topic begins or ends. Media files are often streamed, such as during a conference. A company and/or a conference administrator may want to restrict or limit access to suitably privileged individuals and also grant access when appropriate during such conferences. For example, a user may have authorization to see the planning portion of a conference but not be authorized to access portions of a conference that address salary information, business plans, finances, merger information, performance, and other discussion elements for which the user may be unauthorized.

It is often a burdensome and error-prone approach to apply security tags to the relevant portions of a media file, especially for a large and diverse number of potential conference participants. This can present security risks when tagging is less restrictive than indended and may be an unnecessary burden to productivity when tagging is overly restrictive. There are also situations in which some elements should be limited to one set of participants while other elements can be tagged and made appropriately available to additional participants or even all participants.

Tagging of media files is useful and often provides searchable content or labels indexing content within a recorded audio/video conference media file. The tags may be embedded within the media file or maintained separately from the media file(s). For example, Extensible Markup Language (XML) provides one means to tag a media file. Despite the tagging tools and usability provided by tagging media files, problems remain.

SUMMARY

It is with respect to the above issues and other problems that the embodiments presented herein were contemplated. The disclosure provided herein solves these and other problems by, among other things, providing multiple levels of security through tagging. Security levels and related actions can be controlled by an administrator to improve security for sensitive information shared on the audio/video conference. System performance may be improved by the implementation of certain embodiments provided herein. For example, the improved means to set and manage security privileges reduces computational overhead, such as by automatically modifying a security policy for a tagged portion of a media file without the need to re-interpret the meaning of a prior art tag and applying security policies therefrom.

In one embodiment, a system and method is used to provide multi-level security tags to flexibly allow, restrict, and/or redact portions of a media file during its distribution to a group of users having mixed access/security permissions, such as during an audio/video conference. Access, denial, and/or redaction may be based upon a security policy associated with a predetermined or custom security level for identified tags. The predefined security levels for tags can impose different security levels or actions and displays for audio/video conferences during a meeting and for content that may be available after the conference.

Security tags may be applied during the course of the audio/video conference to the conference as a whole, to specific content, and/or to points/spans of time within the audio/video conference. The security tags can impose specific security implications set by an administrator, a participant, and/or a supervisor who may or may not be a participant in the conference (e.g., human resource, security, and/or management personnel). Tagging may be applied to the media stream, or a portion thereof, before and/or during the conference and/or to a media file comprising at least one portion of the recorded conference or a portion thereof. A portion of a media stream, or media file, may be a channel, such as an audio channel while a particular topic is discussed, a previously created content for the presentation (e.g., video, audio, document, etc.), links, channel for a particular participant, particular media channel (e.g., audio, video, instant message/chat, document, etc.)

Security tags may be associated with a given security context that limits access to the content of a recording, transcription, or other artifacts associated with the audio/video conference, or parts thereof, and/or limits a user's search utility's apparent or actual functionality to portions of a media file for which they are suitably privileged. Security tags may additionally govern redaction of said materials or specific passages prior to dissemination of content; alternatively or additionally, the tags themselves may require redaction from the associated materials prior to dissemination. Security tags applied during the course of the audio/video conference may trigger real-time alerts to the audio/video conference moderator and/or specific other parties on the audio/video conference; for example, where certain attendees may not be privy to the present topic of conversation from which the tag(s) derived. Security tags may contain associated retention policies, or indicate one or more retention policies for portions of a media file.

In a non-limiting example, a software company holds monthly product review meetings. The meetings are global conference calls covering customer issues, current schedule, roadmap planning, and staffing allocations. With a wide range of participants and resulting information, the group uses tagging as a way to reference historical meeting content, which is made available to other managers and executives across the company. Some participants are required to leave the meeting for more sensitive parts of the call (e.g., staffing decisions, roadmap discussions, merger and acquisition activities, etc.). Through the use of security attributes attached to each tag, the results can be shared knowing that sensitive portions of the meeting will only be available to those with proper authority.

Security tags may be attached via various methodologies in real-time or before or after a conference. For example, in response to a user or other human input manually assigning a tag during the conference, during post-conference review, a default level, and/or the automatic application thereof. For example, certain keywords or phrases may be designated as having a particular meaning and a tag associated with the keywords or phrase. Once one of the keywords or phrases is detected, a tag may be automatically applied and the security policy associated therewith, executed. An authorized human operator may be able to override the tag and/or provide an alternative or additional security tag. The human operator may be prompted to confirm the application of a particular tag, which may be automatically paused waiting for the human operator to confirm or decline the application of a particular tag.

The security policy associating tags with people or classification of people (e.g., title, rank, department, project, role, etc.) may be provided via a conferencing application, a custom system, and/or via other corporate data repositories and applications, such as human resources, project management, etc.

In one embodiment, the content is generated as a result of the meeting through standard methods of manual and/or automatic tagging. The meeting content is dynamic, generated during the meeting, and protected based on group or individual security attributes. Both the tags/content and the people/groups have security attributes assigned thereto that may be dynamically determined based upon their role, a recent assignment, or other cascading access rights.

In another embodiment, tagging provides selective protection or access during a meeting and after a meeting, as may be provided in response to a search, summarization, and other activities performed by individuals or groups. A tag may cause a portion of a conference to be hidden and, optionally, the tag itself to be non-existent, with respect to an unauthorized user. In another embodiment, a tag may be associated with a security policy that, upon the occurrence of an event (e.g., a press release, passage of time, etc.), the effect upon at least one user is modified such that access once denied is now provided. While the passage of time generally causes security requirements to diminish, one may modify certain embodiments disclosed herein to increase the level of security over time or upon the occurrence of an event without departing from the disclosure provided herein.

In one embodiment, a system is disclosed, comprising: a media server configured to present a media stream to a first user, the media stream having at least a first and second media stream portion, wherein the first media stream portion has at least a first permission tag indicating a security policy for the first media stream portion, wherein the second media stream portion has at least a second permission tag indicating a security policy for the second media stream portion, and wherein the at least a first permission tag is a parent tag and the at least a second permission tag is a nested tag having a more restrictive security policy than the parent tag; a data storage comprising a permission attribute of the first user; and a processor configured to cause the media server to present the media stream to the first user and omit the second media stream portion upon determining that the permission attribute of the first user is not associated with a security policy of the nested tag associated with the second media stream portion.

In another embodiment, a method is disclosed, comprising: authenticating a user and obtaining a permission attribute of the user; establishing a communication session between the user and a media server over a network; accessing at least one media file, comprising: media content, the media content having at least a first and second media content portion, wherein the first media content portion has at least a first permission tag indicating a security policy for the first media content portion, wherein the second media content portion has at least a second permission tag indicating a security policy for the second media content portion, and wherein the at least a first permission tag is a parent tag and the at least a second permission tag is a nested tag having a more restrictive security policy than the parent tag; and presenting the media content to the user and redacting the second media content portion upon determining that the permission attribute of the user is not associated with a security policy of the nested tag associated with the second media stream portion.

In yet another embodiment, a method is disclosed, comprising: means for establishing a communication session between a first user and a media server over a network; means for authenticating the first user and obtaining a permission attribute of the first user; means for accessing at least one media file, comprising: media content, the media content having at least a first and second media content portions, wherein the first media content portion has at least a first permission tag indicating a security policy for the first media content portion, wherein the second media content portion has at least a second permission tag indicating a security policy for the second media content portion, and wherein the at least a first permission tag is a parent tag and the at least a second permission tag is a nested tag having a more restrictive security policy than the parent tag; and means for presenting the media content to the first user and redacting the second media stream portion upon determining that the permission attribute of the first user is not associated with a security policy of the nested tag associated with the second media stream portion.

The term "conference" as used herein, refers to a meeting or presentation comprising at least one participant viewing, or at least one device storing, electronic representations of the conference from a conference server. The conference server may be a dedicated conference server, a shared conference server, or a host (e.g., personal computer, mobile device, etc.) executing a conference serving application, which may include both the capturing of conference content (e.g., audio, video, displaying documents, etc.) and providing the conference to one or more participants and/or conference storage device. The host may be one participant's device which then adds one or more other participants (ad-hoc conferencing). While a conference generally comprises a number of human participants, in certain embodiments, a conference may comprise non-human content providers with respect to the conference at the time being accessed. For example, a participant may be viewing a conference in the form of a recorded or generated audio/visual presentation without departing from the scope of the disclosure provided herein.

The term "security tag" and, more simply, "tag" may be used interchangeably herein. A tag may be a marker or any other data structure within a media file, such as a file comprising all or a portion of a conference comprising a media file or files. A tag may be embedded or segregated into a file or location different from the media file.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium," as used herein, refers to any tangible storage that participates in providing instructions to a processor for execution. Such a medium may take many forms, including, but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid-state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine," "calculate," and "compute," and variations thereof, as used herein, are used interchangeably and include any type of methodology, process, mathematical operation or technique.

The term "module," as used herein, refers to any known or later-developed hardware, software, firmware, artificial intelligence, fuzzy logic, or combination of hardware and software that is capable of performing the functionality associated with that element. Also, while the disclosure is described in terms of exemplary embodiments, it should be appreciated that other aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising an element number, without a subelement identifier when a subelement identifier exists in the figures, when used in the plural, is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices that may be shown in block diagram form, and are well known, or are otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
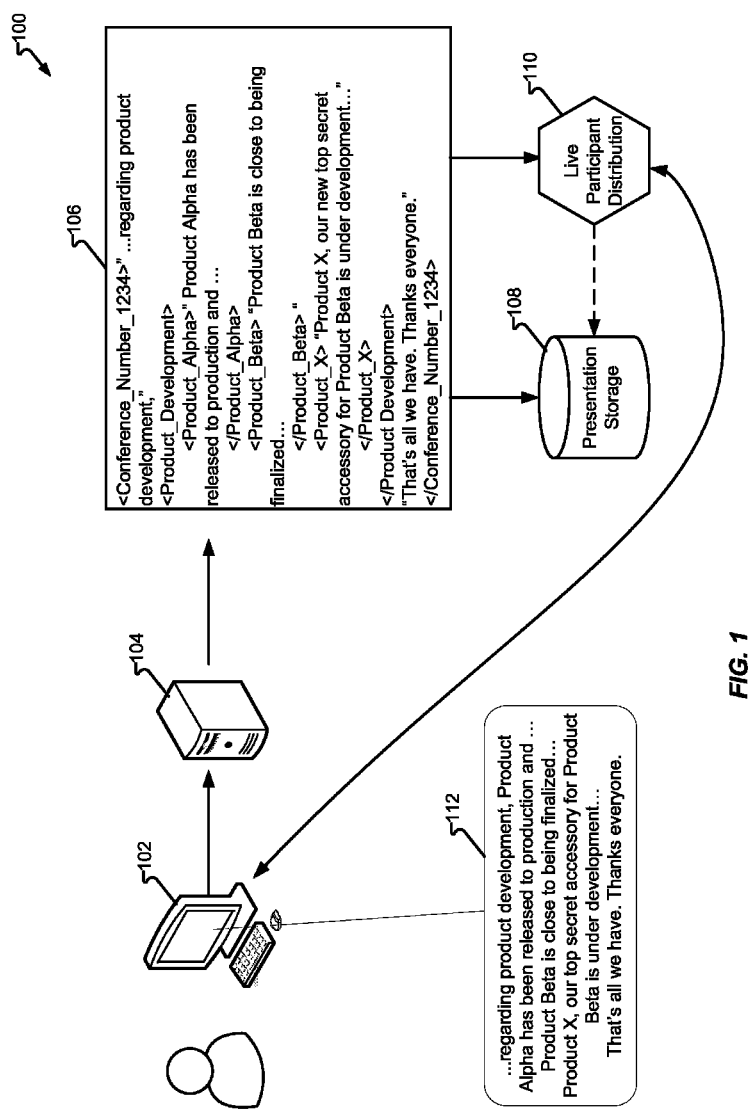
FIG. 1 depicts a first system in accordance with embodiments of the present disclosure.

FIG. 1 depicts system 100 in accordance with embodiments of the present disclosure. In one embodiment, a media stream is created and/or managed by media capture device 102. Media capture device 102 may also receive the stream from live participant distribution 110, such as to include media channels from other participants or providers. The media stream may comprise one or more channels of media from a number of sources, such as when the media stream comprises conference content 112. Conference content 112 is provided to server 104, which provides tags in the creation of tagged media file 106 to presentation storage 108 and/or live participant distribution 110. Alternatively, presentation storage 108 may receive tagged media file 106 from live participant distribution 110.

Server 104 and media capture device 102 may be discrete devices or co-processes on the same device. Media capture device 102 provides one means to electronically capture audio, still images, video images, links, documents, or other conference content. Media capture device 102 may comprise a plurality of devices, such as may be associated with a number of conference participants. Media capture device 102 may provide a single means of content capturing (e.g., a telephone capturing audio only) or may capture a plurality of content (e.g., a smart phone having a microphone to capture audio and a camera to capture video). Accordingly, media capture device 102 may be embodied as a personal computer, telephone, smart phone, or other device or combination of devices capable of capturing conference content.

Server 104 is configured to apply tags to conference content 112. In one embodiment, server 104 applies tags based upon default security policy rules, such as those that may apply before, during, or after the conference. Default rules may be applied based upon a participant, a title of a presentation, etc. In other embodiments, the user, such as a host, moderator, or nonparticipant (e.g., security personnel, manager, etc.) may determine a default rule for a particular conference and apply the tag accordingly. In other embodiments, a device, such as media capture device 102, may receive a manual input indicating a security tag for a particular portion of conference content 112 or the entirety of the conference. Additionally, server 104 may automatically apply tags based upon speech recognition of words or phrases previously determined to be associated with a particular security policy and apply the tag accordingly. Human or automated means may also apply the tag after the conference has been created, such as during a post-conference review.

In one embodiment, server 104 applies tags to create tagged media file 106. In one embodiment, the tags employ the Extensible Markup Language (XML) format. In another embodiment, a separate file may be created indicating portions of conference content 112, such as limited by markers or timestamps, and a security tag associated therewith. For example, a media file or stream may be "tagged" as "salary" between the runtimes of 4:15 and 6:35 in a separate file or data structure without altering the media file or stream itself. The resulting media stream portion of conference content 112, or the entirety thereof, may be encrypted such that the encrypted portions are provided, directly to or on the behalf of a permitted user, with decryption means to receive the encrypted content. Alternatively, server 104 or other component may omit providing portions of conference content 112 to users not sufficiently authorized.

In one embodiment, live participant distribution 110 provides streaming services to a number of other participants viewing conference content 112. Accordingly, the means to selectively include or omit portions of conference content 112, based upon a particular user's security authorization and the associated tag provided by tagged media file 106 or portion thereof, may be provided by live participant distribution 110. Live participant distribution 110 may manage a conference by, for example, receiving login requests, such as usernames and passwords, and accessing a security profile to determine if a particular user is authorized to see any portion of conference content 112 and, if yes, determine which portions should and should not be included based upon tags within, or associated with, tagged media file 106.

In one embodiment, the tags associated with tagged media file 106, whether embedded or distinct therefrom, are arranged in a logical hierarchy. As will be discussed in more detail in the figures that follow, a tag may be nested within one or more other tags to easily provide security tagging with limited or no human involvement. For example, if conference content 112 included discussions of the salary requirements to lure a high-profile employee away from a competitor, a tag such as "salary" may be applied. Salary discussions are herein assumed to be confidential and restricted to only those personnel requiring such knowledge to perform their work assignments. The tag "salary" may be a sub-tag nested within "payroll," which may be nested within "staffing," which may be further nested within "human resources." Accordingly, a user who is authorized for content tagged with "staffing" may not be authorized to receive content tagged with "payroll" and, accordingly, be omitted from receiving content tagged as "salary" due to the security policy associated with the parent tag, "payroll." The hierarchy of tags may be provided manually or automatically, such as by known linguistic analysis techniques. Additionally, tags may themselves be excluded from unauthorized recipients.

Figure 2:
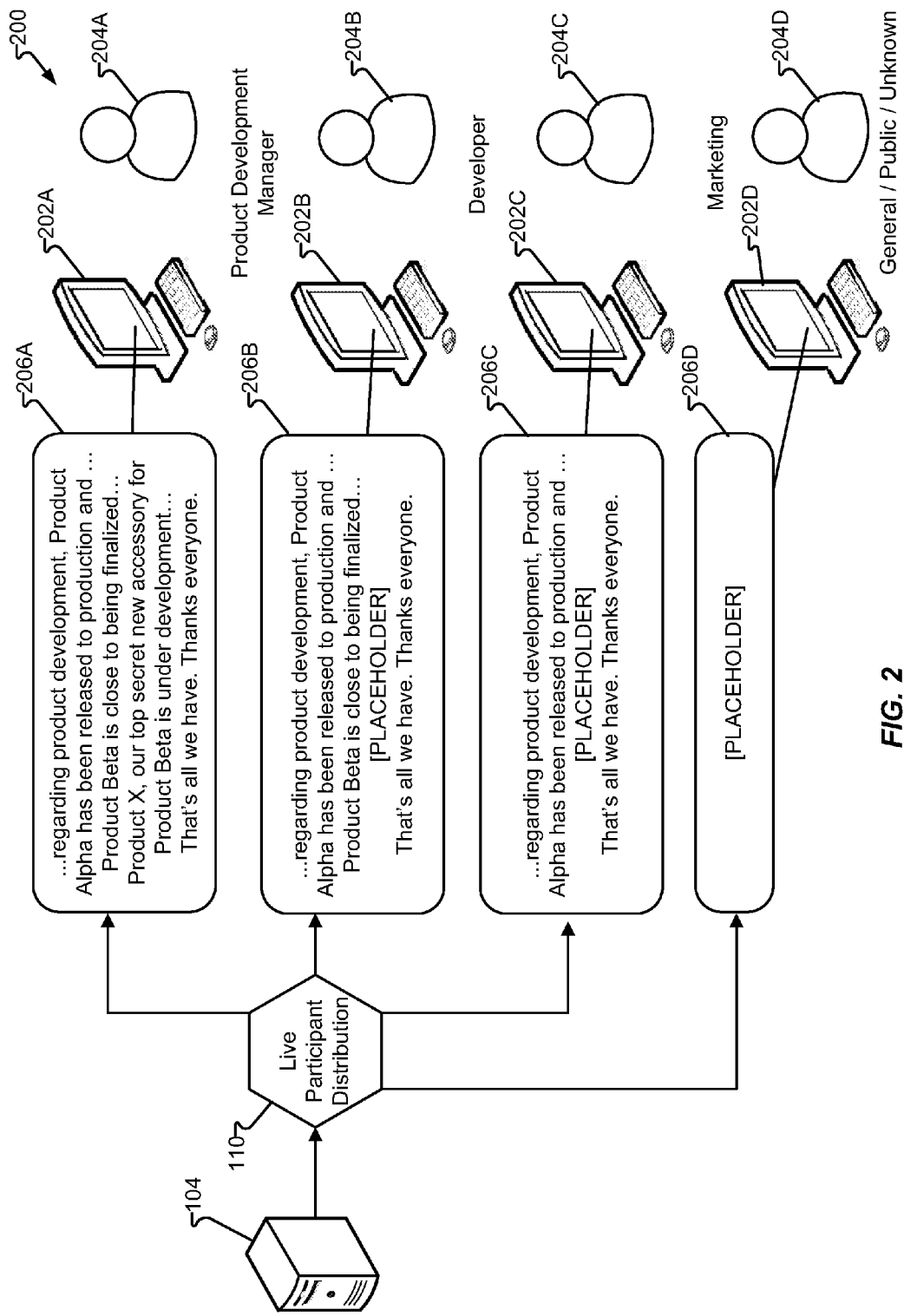
FIG. 2 depicts a conference in accordance with embodiments of the present disclosure.

FIG. 2 depicts conference 200 in accordance with embodiments of the present disclosure. In one embodiment, server 104 provides a live conference stream, such as conference content 112, to live participant distribution 110. Live participant distribution 110 then broadcasts the conference stream to a number of user devices 202 for the benefit of their associated users 204A-D.

Users 204 comprise a number of individuals identified, such as by a username and password used to access live participant distribution 110. For example, user 204A may be a product development manager having a greater need to receive information, which may be confidential and otherwise restricted from other users. In another example, user 204B may be a developer having a need for confidential information related to particular products under development, user 204C may be a marketing staff member having a need for information related to marketing, and user 204D may be a general employee, an unknown user (e.g., guest), or member of the general public (e.g., media, investor, customer, vendor, etc.).

Users 204, having authenticated themselves with live participant distribution 110 and/or server 104, are each associated with a particular security profile. Live participant distribution 110 then provides media stream 206A-D to the associated ones of participants 204 upon their respective devices 202. In one embodiment, media stream 206A comprises the entirety of the conference, such as conference content 112. No portion of media stream 206A is omitted or redacted from what is provided by server 104 and/or live participant distribution 110. Media streams 206B, 206C, and 206D each have redactions for certain conference portions for which they are not authorized. The redactions may be silence, music, or other placeholder for audio content. For video or visual portions, a redaction may be a blank image or a placeholder image operable to inform the participant that the connection to live participant distribution 110 remains and/or the content is being redacted for security reasons.

Figure 3:
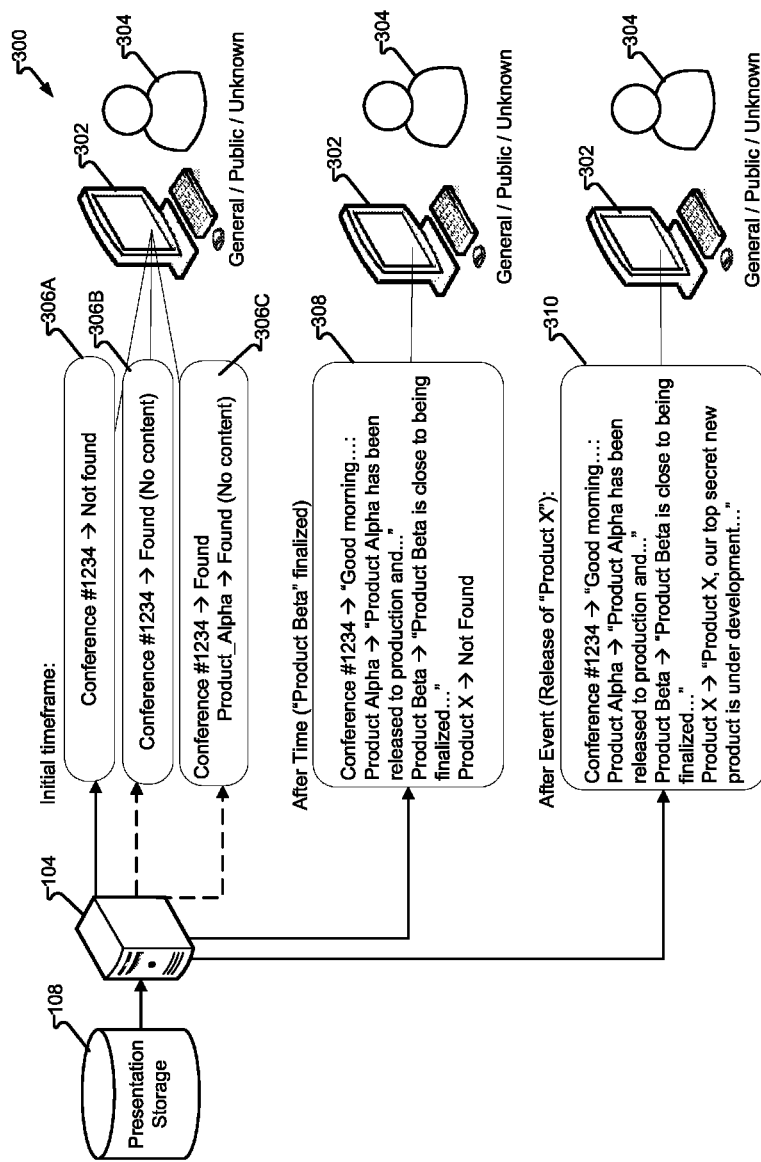
FIG. 3 depicts searches in accordance with embodiments of the present disclosure.

FIG. 3 depicts searches 300 in accordance with embodiments of the present disclosure. A conference may be stored in one or more media files in a repository, such as presentation storage 108, which may then be made available for subsequent access by user 304. In one embodiment, conference content 112 is stored within presentation storage 108 for presentation by server 104. Users 304 authenticate themselves with server 104, which in turn accesses a security profile associated with each of users 304. Server 104 accesses conference content 112 stored within presentation storage 108 for streaming, including downloading, to the respective users 304 in accordance with security tags and their associated security policy, such as the effect of the tag may be modified by the passage of time or the occurrence of an event.

In one embodiment, user 304 utilizing device 302, has limited rights to a particular conference stored within presentation storage 108. Server 104 may then stream conference content 306A, comprising a null-conference (e.g., a conference with zero length and/or content) or simply not acknowledging the presence of the conference itself or any content therein. In another embodiment, conference content 306B acknowledges the existence of the conference, however, no content is provided. In yet another embodiment, the conference itself is acknowledged and one component of the conference is acknowledged, but also with the content therein being omitted.

In another embodiment, a period of time has passed, such as the occurrence of an event (e.g., the release or product, a press release, a product being finalized, etc.). User 304 may then be provided with conference content 308 providing content not previously available to user 304 during the initial timeframe. After the further passage of time, user 304 may receive conference stream 310 comprising more, or even all, of conference content 112.

As a benefit, system 300 provides a means to modify the conference portions that may initially be restricted from user 304, but at some point in the future become accessible. For example, a security tag, such as "Product_X," may be associated with a highly restrictive security policy up until the point in which product X becomes publicly available. After which time, conference content tagged with "Product_X" may be made more freely available.

Figure 4:
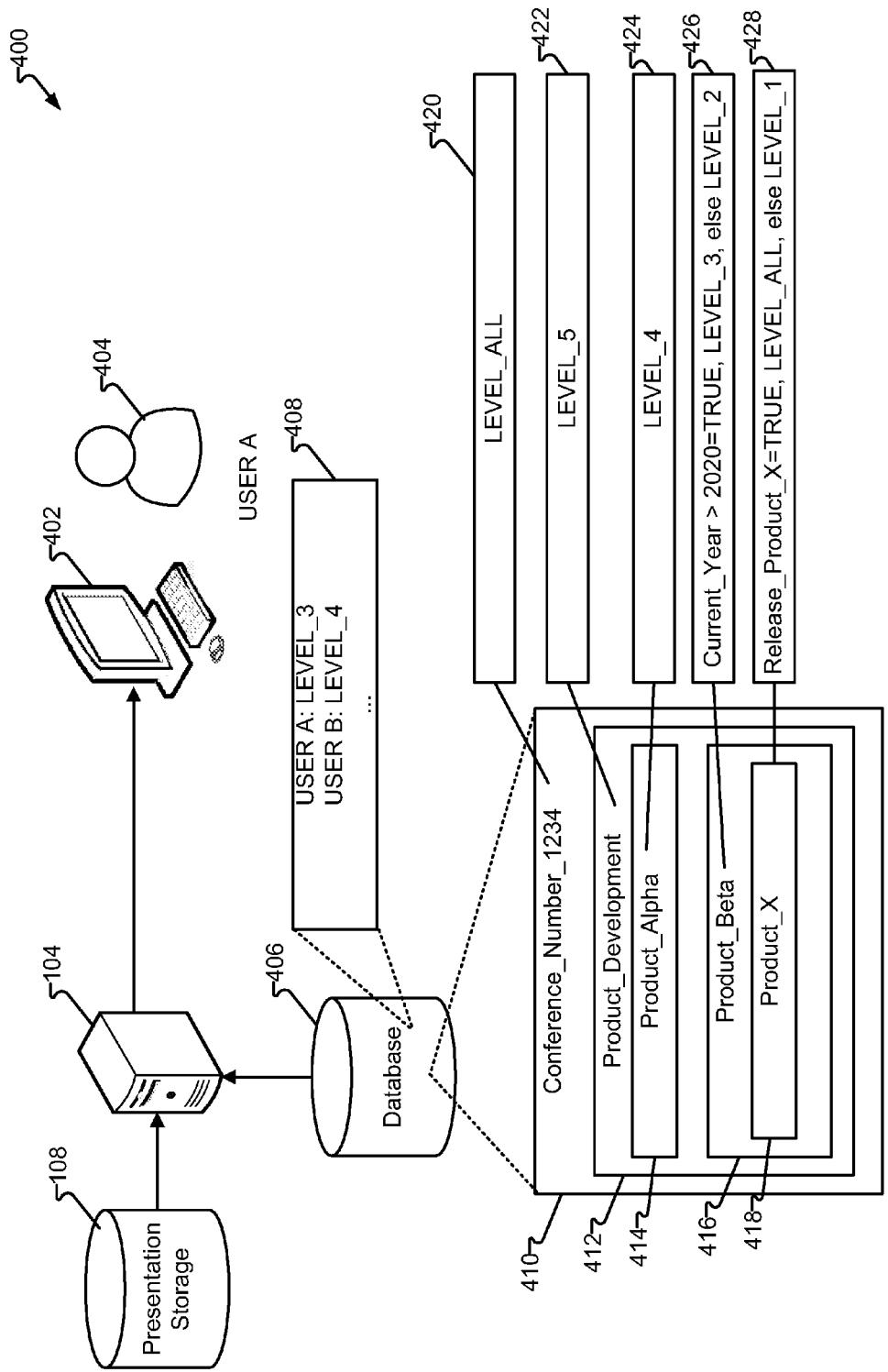
FIG. 4 depicts a second system in accordance with embodiments of the present disclosure.

FIG. 4 depicts system 400 in accordance with embodiments of the present disclosure. In one embodiment, user 404, utilizing device 402, authenticates themselves with server 104 with access to database 406. Database 406 may comprise, or be integrated with, presentation storage 108, and/or one or more data repositories, or be distinct therefrom. In one embodiment, database 406 comprises user attribute table 408 associating, at least, user 404 with at least one security policy attribute. User attribute table 408 may comprise single entries or a number of entries indicating a security level associated with products, departments, roles, etc. as may be determined by a particular enterprise or administrator.

Database 406 may also comprise security policy 410 associated with the tags for one or more conference contents, such as conference content 112. Security policy 410 may indicate a number of tags 412, 414, 416, 418 and a hierarchy therebetween. For example, tag 414 is a sub-tag of tag 412, tag 418 is a sub-tag of tag 416, and tags 412 and 416 are each sub-tags of security policy 410, such as for the entirety of a conference.

Tags 412-418 are then associated with one or more security rules, such as security rules 420, 422, 424, 426, 428. Security rules 420-428 may be fixed, with respect to a particular topic and the security provided thereto, or dynamic and change over time or upon the occurrence of an event. In one embodiment, security policy 410 is a tag associated with the entirety of a conference, which may be the default security policy provided by rule 420 indicating that all users have access unless otherwise tagged. For example, all users may discover that the particular conference exists and be presented with content not otherwise tagged with a more restrictive tag.

In another embodiment, tags 412 and 414, associated with security rules 422, 424, respectively, indicate a security level requirement to receive any content being tagged with tags 412 or 414. For example, user 404, having a security "level 3," may be denied access to any content tagged with tags 412 or 414 as such tags have an associated security policy defined by security rules 422 and 424 indicating a requirement for "level 4" or "level 5," assuming a greater number indicates a more restrictive security policy. A security policy may determine if the tag itself is to be restricted to authorized users.

In another embodiment, nested tag 418 is associated with security rule 428 indicating that upon the release of a product the security policy allows for "all access;" however, if the product has not been released, the security policy is to restrict access to those having a low level of security clearance (e.g. "level 1"). The passage of time may be sufficient to modify a particular security policy. For example, tag 416 is associated with security rule 426 indicating a security policy that changes upon the passage of time to become less restrictive.

Figure 5:
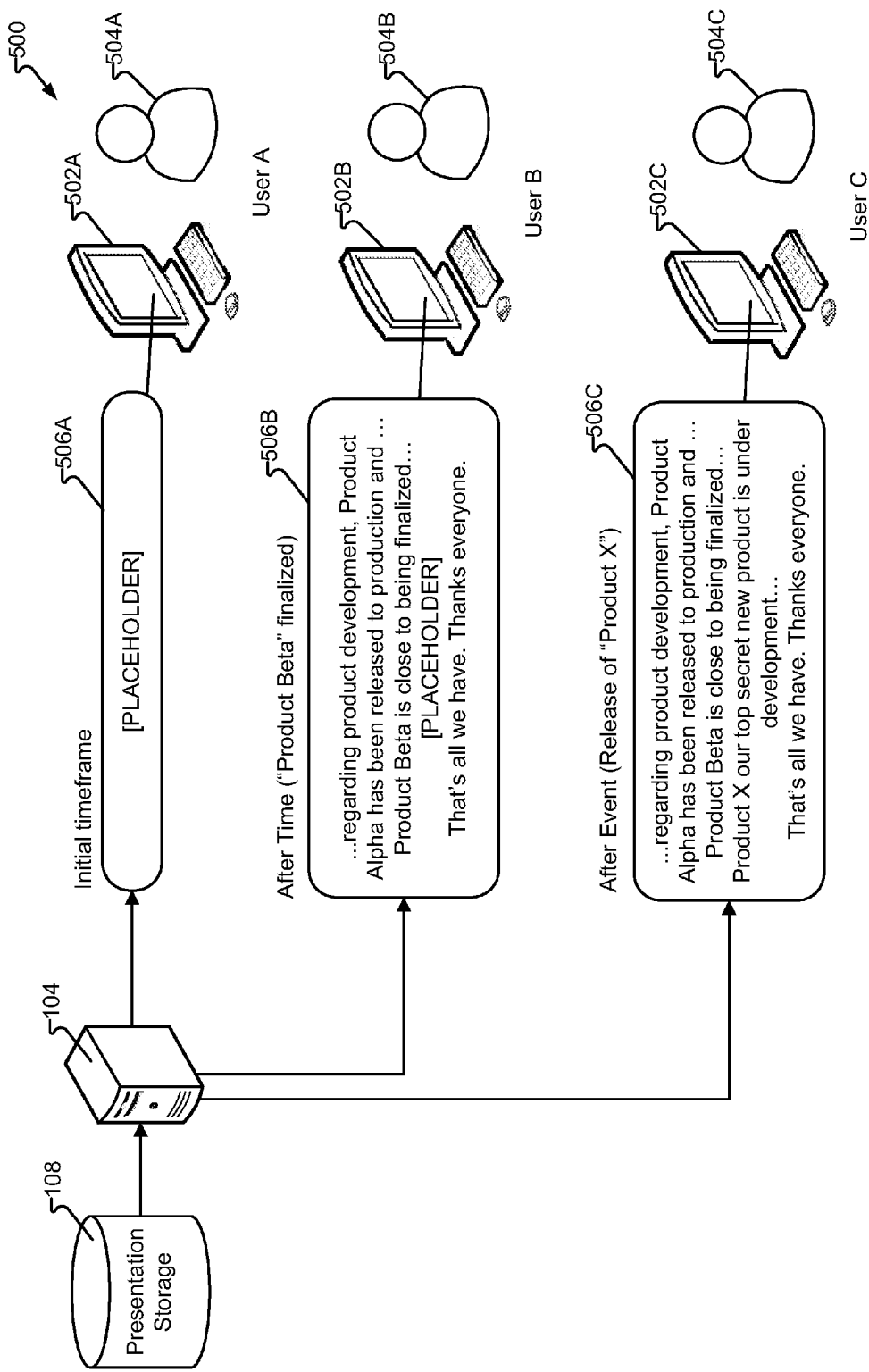
FIG. 5 depicts a third system in accordance with embodiments of the present disclosure.

FIG. 5 depicts system 500 in accordance with embodiments of the present disclosure. System 500 illustrates three users—user A (504A), user B (504B), and user C (504C)—accessing a stored conference content, such as recorded conference content 112 being streamed or downloaded. Users 504A-C may be requesting a conference directly from server 104 or utilizing a search application that, on behalf of user 504, attempts to identify portions of the presentation within presentation storage 108 associated with a search request.

In one embodiment, user 504A utilizing device 502A attempts to access conference content within presentation storage 108 at a first time, such as an initial period of time following the conference creation. Presentation results 506A may be blank, not acknowledged (e.g., "file not found," etc.), or acknowledged as existing but omitting the content therein. After the passage of time, presentation results 506B may be provided whereby additional information becomes available automatically. In yet another embodiment, following the passage of additional or alternative periods of time or upon the occurrence of an event, presentation results 506C may comprise more or all of a presentation's content in accordance with the security policy associated with the tags therein.

Figure 6:
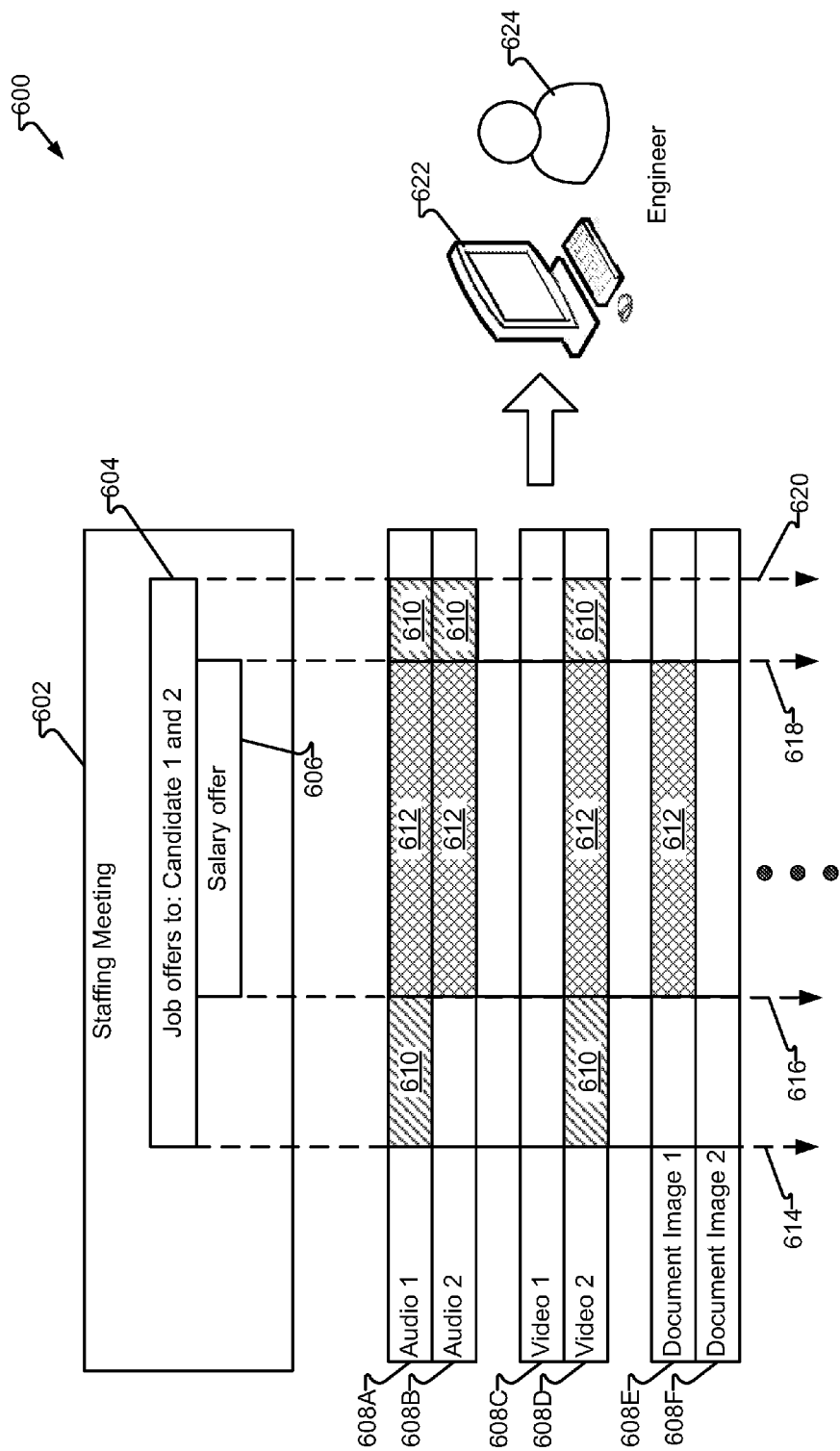
FIG. 6 depicts a security tag in accordance with embodiments of the present disclosure.

FIG. 6 depicts conference 600 in accordance with embodiments of the present disclosure. In one embodiment, conference 600 comprises a live stream, such as provided by live participant distribution 110 associated with server 104. In another embodiment, conference 600 is retrieved from storage, such as one or more media files stored in presentation storage 108. Participant 624, utilizing device 622, is authenticated to receive at least a portion of conference content 602. Conference content 602 has been tagged to indicate first portion 604 and second portion 606.

First portion 604 begins at tag 614 and ends at tag 604. Second portion 606 begins at tag 616 and ends at tag 618 and is associated with its respective security policy. Conference 600 comprises a plurality of media channels 608A-F, such as first audio channel 608A, second audio channel 608B, first video channel 608C, second video channel 608D, first document image channel 608E, and second document image channel 608F. Media channel 608 may be associated with individual conference participants or with a particular media type (e.g., audio, video, etc.) from one or more participants. Tag 614 may be a XML-type tag (e.g., "<Job_Candidates>") with an identifying end-tag, such as tag 620 (e.g., "</Job_Candidates>"). Similarly, tag 616 may comprise an XML tag (e.g., "<Salary>") and an end tag, such as tag 618 (e.g., "</Salary>"). Alternatively, tags 614, 616, 618, and 620 may be points on a timeline for conference 600, (e.g., "Job_Candidates, begins 10:15, ends 12:56"; and "Salary, begins 11:15, ends 12:05").

User 624, having authenticated themselves with the appropriate application or server, possesses certain security attributes that, when matched against first portion 604 and second portion 606, selectively allow or deny access to conference content 602 or portions thereof. For example, user 624 is denied access to first restricted content 610 associated with first conference portion 604 between tag 614 and 620 as well as second restricted content 612, associated with second conference portion 606 between tags 616 and 618.

As a benefit of the embodiments provided herein, tagging associated with second portion 606 may automatically be applied to first content portion 604 without the need for separate tagging. For example, tagging of salary information associated with second conference portion 606 and second restricted content 612 may be automatically applied to portions of first conference content 604. As a benefit, user 624 may, such as due to the passage of time or the authorization to receive access to restricted content, may become authorized to receive second conference content 606 on all channels 608, but not all first conference content 604 on all channels 608. Therefore, while the content may be arranged hierarchically, the security tags associated therewith may be arranged in a different hierarchy, such as when certain details become accessible to a particular user, but not the higher-level concepts associated therewith.

Figure 7:
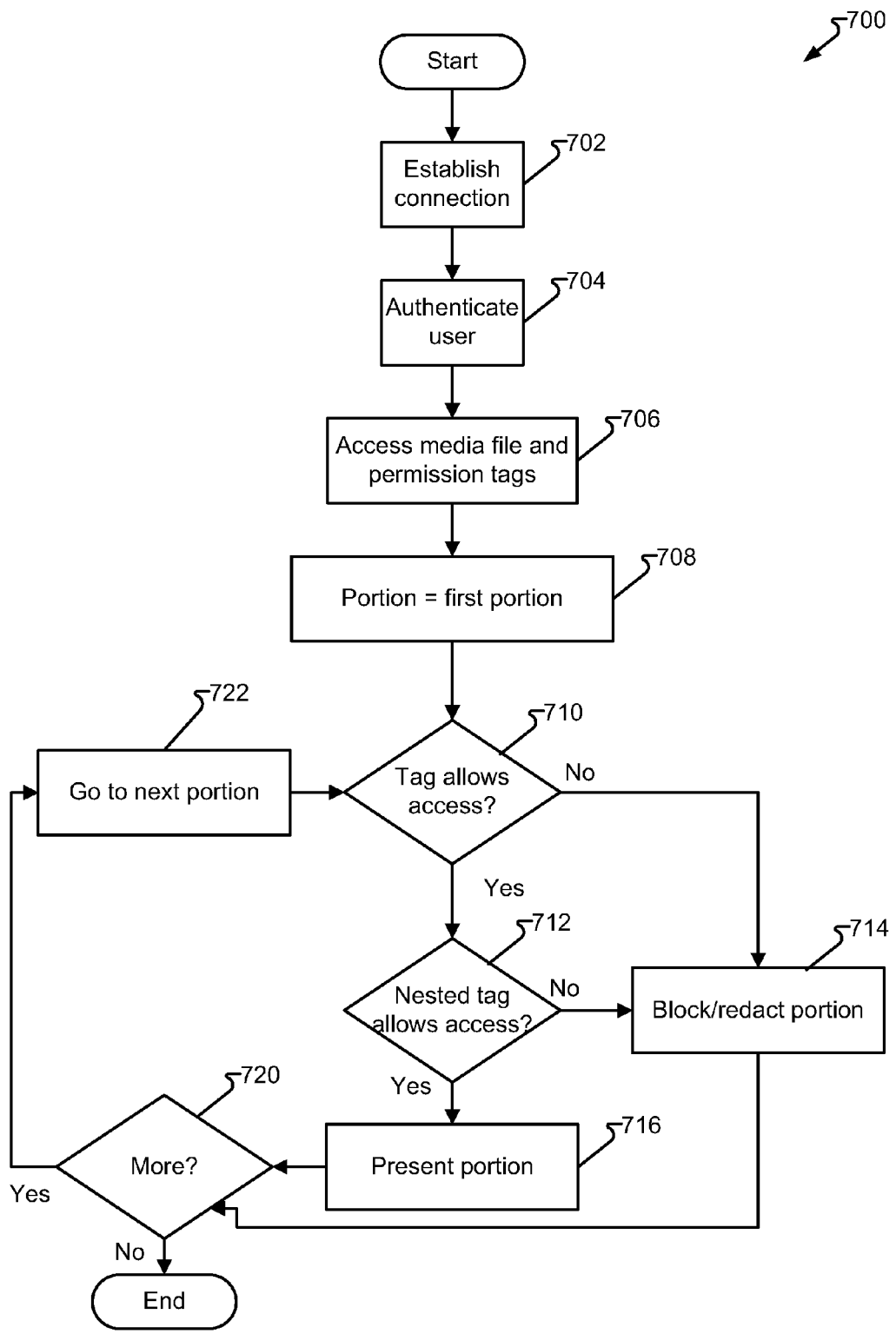
FIG. 7 depicts a process in accordance with embodiments of the present disclosure.

FIG. 7 depicts process 700 in accordance with embodiments of the present disclosure. Tags may be variously applied to a media file or portion of a media file, whether live, streamed recording, or downloaded. The application of a tag may be automatically applied to a live media stream of a conference upon a particular security policy rule being executed. For example, if the term "salary" was detected by an automatic speech recognition module, a start tag may be applied to the conference (e.g., "<Salary>"). A rule may be associated with the tag such that that a set period of time of the conference is tag. The period for a particular tag may be re-evaluated. For example, a conference stream may be tagged as "Salary" in increments of twenty seconds. Additionally, the stream may be periodically re-evaluated, such as every five or ten seconds, to determine if any additional content has been encountered that is associated with the tag, "salary." If, so the placement of the eventual ending tag (e.g., "</Salary>") may then be pushed back an additional twenty seconds. The security policy for subsequent extensions may be different from the initial timeframe. For example, a single utterance of "pay raise" may trigger the conference to be tagged as "Salary" for the next twenty seconds, if during that time another word or phrase associated with the tag "Salary" is encountered (e.g., "pay raise," "promotion," "payroll," etc.) the endpoint may be pushed back thirty seconds.

In another embodiment, the automatic application of ending tags may utilize an explicit change in topic. For example, the tag "salary," once initiated, may be associated with the remainder of the conference until such time as a new topic is detected (e.g., "let's move on," "Now to cover Product X," etc.) or until the conference ends. A participant, who is not authorized to receive such content may receive a message that is static (e.g., "The conference is currently addressing a topic that you are not authorized to receive, please wait.") or dynamic (e.g., "The conference is currently addressing a topic that you are not authorized to receive. Your conference is expected to resume in thirty seconds."). The dynamic content may be periodically updated (e.g., "An addition one minute has been added to your estimated wait time."). If an agenda is provided or available, the estimated wait may be associated with a wait time (e.g., "You are not authorized to receive conference content for agenda item #4. Your conference should resume with agenda item #5 at 10:30"). The estimation associated with an agenda item may be based on historical records for past conferences discussing the same or similar agenda items, the number of participants, the participants themselves (e.g., certain participants historically want or provide more details.), the detail in the agenda (e.g., the topic tagged as "salary" has thirty sub-items), etc. For recorded content, the endpoint of a conference portion having a tag can be known. The recorded conference that is then streamed or downloaded to a recipient who is not authorized to receive the content with the tag may have the option to skip ahead to the next conference portion for which they are authorized.

In another embodiment, a conference server 104 and/or live participant distribution 110 may apply bandwidth saving techniques. For example, if no live conference participant is authorized to receive content from a particular participant, the conference content from that particular participant may be discarded or, if so selected, recorded only without going through the conference mixing services, such as provided by live conference distribution 110.

In one embodiment, process 700 begins and step 702 establishes a connection between the user's device and a server, such as user 204A utilizing device 202A to receive conference content from server 104. In one embodiment, the receiving of conference content 112 may comprise receiving a live feed or the downloading presentation of generated or recorded content, such as from presentation server 108 and media files contained therein. Step 704 authenticates the user requesting access to the presentation content. Authentication step 704 further comprises determining security attributes associated with the user.

Next, step 706 accesses media file and permission tags associated with the user as well as security tags associated with the media content of a requested conference. Step 708 sets the current portion to the first portion of the conference content. The first portion being delimited by the beginning of the conference content 112 until the first security tag is encountered as measured from the time within the presentation. However, it should be noted that the first security tag may be encountered at a point synonymous with the beginning of the conference content.

Step 710 determines if the tag allows access to the conference portion which follows. If step 710 is determined in the affirmative processing continues to step 712 whereby a nested tag is encountered. If step 710 is determined in the negative and access is to be denied, processing continues to step 714 and the subsequent conference portion is blocked, such as by omission or redaction. If step 712 is determined in the affirmative, processing continues to step 716 whereby the conference portion is presented. Step 720 determines if more presentation portions exist and, if so, the next portion is considered at step 722, which then loops back to step 710.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU), or logic circuits programmed with the instructions to perform the methods (FPGA). These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process, which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium, such as a storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A system, comprising:
a media server configured to present a media stream to a first user, the media stream having at least first and second media stream portions, wherein the first media stream portion has at least a first permission tag indicating a security policy for the first media stream portion and not the second media stream portion, wherein the second media stream portion has at least a second permission tag indicating a security policy for the second media stream portion, and wherein the at least a first permission tag is a parent tag and the at least a second permission tag is a nested tag having a more restrictive security policy than the parent tag;
a data storage comprising a permission attribute of the first user; and
a processor configured to cause the media server to present the media stream to the first user and omit the second media stream portion upon determining that the permission attribute of the first user is not associated with a security policy of the nested tag associated with the second media stream portion.

2. The system of claim 1, wherein the processor is further configured to cause the media server to omit a second media stream portion upon determining that the permission attribute of the first user is not associated with a security policy of the parent tag associated with the second media stream portion.

3. The system of claim 1, wherein the processor is further configured to cause the media server to omit indicia of the nested tag upon determining that the permission attribute of the first user is not associated with a security policy of the parent tag associated with the nested tag.

4. The system of claim 1, wherein the processor is further configured to cause the media server to omit indicia of the nested tag upon determining that the permission attribute of the first user is not associated with a security policy of the nested tag.

5. The system of claim 1, wherein the processor is further configured to cause the media stream server to present a second media stream portion upon determining that the permission attribute of the first user is associated with the security policy of the parent tag and the nested tag associated with the second media stream portion.

6. The system of claim 1, wherein the media server is further configured to access a media storage comprising a stored media file comprising the permission tags and present the stored media file as the media stream.

7. The system of claim 1, wherein the processor, upon determining that the permission attribute of the first user is not associated with a security policy of the nested tag, causes a security notification to be routed to a second user.

8. The system of claim 1, wherein the processor, upon receiving a search request associated with searching the second media portion stored on a media storage device accessible to the processor, omits searching the second media stream portion upon determining that the permission attribute of the first user is not associated with the security policy of the nested tag.

9. The system of claim 1, wherein the processor, upon receiving a search request associated with searching the second media portion stored on a media storage device accessible to the processor, omits all search results within the second media stream portion upon determining that the permission attribute of the first user is not associated with the security policy of the nested tag.

10. The system of claim 1, wherein the processor, upon receiving a search request associated with searching the second media portion stored on a media storage device accessible to the processor, omits all search results of the nested tag upon determining that the permission attribute of the first user is not associated with the security policy of the parent tag.

11. The system of claim 1, wherein the security policy of at least one permission tag is modified by the occurrence of a predetermined future event.

12. The system of claim 11, wherein the predetermined future event is a temporal event.

13. A method, comprising:
authenticating a user and obtaining a permission attribute of the user;
establishing a communication session between the user and a media server over a network;
accessing at least one media file comprising media content, the media content having at least first and second media content portions, wherein the first media content portion has at least a first permission tag indicating a security policy for the first media content portion and not the second media content portion, wherein the second media content portion has at least a second permission tag indicating a security policy for the second media content portion, and wherein the at least a first permission tag is a parent tag and the at least a second permission tag is a nested tag having a more restrictive security policy than the parent tag; and
presenting the media content to the user and redacting the second media content portion upon determining that the permission attribute of the user is not associated with a security policy of the nested tag associated with the second media stream portion.

14. The method of claim 13, wherein the presenting of the media content comprises the streaming of the media content and the redacting of the second media stream portion comprises omitting the second media stream portion from the streaming of the media content.

15. The method of claim 13, wherein the security policy of at least one permission tag is modified upon the occurrence of an event.

16. The method of claim 15, wherein the event is the temporal event.

17. A method, comprising:
   means for establishing a communication session between a first user and a media server over a network;
   means for authenticating the first user and obtaining a permission attribute of the first user;
   means for accessing at least one media file comprising media content, the media content having at least first and second media content portions, wherein the first media content portion has at least a first permission tag indicating a security policy for the first media content portion and not the second media content portion, wherein the second media content portion has at least a second permission tag indicating a security policy for the second media content portion, and wherein the at least a first permission tag is a parent tag and the at least a second permission tag is a nested tag having a more restrictive security policy than the parent tag; and
   means for presenting the media content to the first user and redacting the second media stream portion upon determining that the permission attribute of the first user is not associated with a security policy of the nested tag associated with the second media stream portion.

18. The method of claim 17, wherein the means for presenting of the media content further comprises means for streaming of the media content and the means for redacting of the second media stream portion comprises means for omitting the second media stream portion from the streaming of the media content.

19. The method of claim 17, further comprising means for a security policy to be modified upon the occurrence of an event.

20. The method of claim 17, further comprising means to notify a second user upon determining that the permission attribute of the first user is not associated with a security policy of the nested tag.

* * * * *